US011325191B2

(12) United States Patent
Ackelid

(10) Patent No.: US 11,325,191 B2
(45) Date of Patent: May 10, 2022

(54) METHOD FOR ADDITIVE MANUFACTURING

(71) Applicant: Arcam AB, Moelndal (SE)

(72) Inventor: Ulf Ackelid, Goeteborg (SE)

(73) Assignee: Arcam AB, Moelndal (SE)

( * ) Notice: Subject to any disclaimer, the term of this patent is extended or adjusted under 35 U.S.C. 154(b) by 591 days.

(21) Appl. No.: 15/495,250

(22) Filed: Apr. 24, 2017

(65) Prior Publication Data

US 2017/0341141 A1 Nov. 30, 2017

Related U.S. Application Data

(60) Provisional application No. 62/340,874, filed on May 24, 2016.

(51) Int. Cl.
*B22F 12/00* (2021.01)
*B23K 15/00* (2006.01)
(Continued)

(52) U.S. Cl.
CPC ............ *B22F 12/00* (2021.01); *B22F 3/1039* (2013.01); *B22F 3/15* (2013.01); *B22F 3/24* (2013.01);
(Continued)

(58) Field of Classification Search
None
See application file for complete search history.

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Klassen, Alexander, et al., "Modelling of Electron Beam Absorption in Complex Geometries", *Journal Of Physics D: Applied Physics*, Jan. 15, 2014, 12 pages, vol. 47, No. 6, Institute Of Physics Publishing Ltd., Great Britain.
(Continued)

*Primary Examiner* — Colin W. Slifka

(74) *Attorney, Agent, or Firm* — Dinsmore & Shohl LLP

(57) ABSTRACT

A method for forming a three-dimensional article through successive fusion of parts of a metal powder bed is provided, comprising the steps of: distributing a first metal powder layer on a work table inside a build chamber, directing at least one high energy beam from at least one high energy beam source over the work table causing the first metal powder layer to fuse in selected locations, distributing a second metal powder layer on the work table, directing at least one high energy beam over the work table causing the second metal powder layer to fuse in selected locations, introducing a first supplementary gas into the build chamber, which first supplementary gas comprising hydrogen, is capable of reacting chemically with or being absorbed by a finished three-dimensional article, and releasing a predefined concentration of the gas which had reacted chemically with or being absorbed by the finished three dimensional article.

20 Claims, 7 Drawing Sheets

(51) Int. Cl.
  *B23K 15/02* (2006.01)
  *B33Y 10/00* (2015.01)
  *B33Y 30/00* (2015.01)
  *B33Y 40/00* (2020.01)
  *B23K 15/10* (2006.01)
  *B23K 26/12* (2014.01)
  *B33Y 70/00* (2020.01)
  *B23K 26/342* (2014.01)
  *B23K 26/70* (2014.01)
  *B22F 3/10* (2006.01)
  *B22F 3/15* (2006.01)
  *B22F 3/24* (2006.01)
  *B23K 26/00* (2014.01)
  *C22C 14/00* (2006.01)
  *C23C 8/08* (2006.01)
  *B23K 103/14* (2006.01)
  *C22C 1/04* (2006.01)
  *B23K 103/08* (2006.01)
  *B23K 103/04* (2006.01)
  *B22F 10/10* (2021.01)

(52) U.S. Cl.
  CPC ...... *B23K 15/0026* (2013.01); *B23K 15/0086* (2013.01); *B23K 15/0093* (2013.01); *B23K 15/02* (2013.01); *B23K 15/10* (2013.01); *B23K 26/0006* (2013.01); *B23K 26/126* (2013.01); *B23K 26/127* (2013.01); *B23K 26/342* (2015.10); *B23K 26/702* (2015.10); *B33Y 10/00* (2014.12); *B33Y 30/00* (2014.12); *B33Y 40/00* (2014.12); *B33Y 70/00* (2014.12); *C22C 14/00* (2013.01); *C23C 8/08* (2013.01); *B22F 10/10* (2021.01); *B22F 2003/241* (2013.01); *B22F 2998/10* (2013.01); *B22F 2999/00* (2013.01); *B23K 2103/04* (2018.08); *B23K 2103/08* (2018.08); *B23K 2103/14* (2018.08); *C22C 1/0458* (2013.01); *Y02P 10/25* (2015.11)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0175495 A1 | 8/2005 | Rak et al. |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |

(56) References Cited

U.S. PATENT DOCUMENTS

| | | |
|---|---|---|
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0058002 A1 | 3/2012 | Ivasishin et al. |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0255240 A1* | 9/2014 | Fang .................... B22F 3/101 419/29 |
| 2014/0263246 A1 | 9/2014 | Brice |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2016/0354976 A1* | 12/2016 | Zhang .................... B33Y 70/00 |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| DE | 102010041284 A1 | 3/2012 | |
| DE | 102011105045 B3 | 6/2012 | |
| DE | 102013210242 A1 | 12/2014 | |
| EP | 0289116 A1 | 11/1988 | |
| EP | 0322257 A2 | 6/1989 | |
| EP | 0411537 A1 * | 2/1991 | ............ C22F 1/183 |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 1721725 A1 | 11/2006 | |
| EP | 1752240 A1 | 2/2007 | |
| EP | 1952932 A2 | 8/2008 | |
| EP | 2011631 A1 | 1/2009 | |
| EP | 2119530 A1 | 11/2009 | |
| EP | 2281677 A1 | 2/2011 | |
| EP | 2289652 A1 | 3/2011 | |
| EP | 2292357 A1 | 3/2011 | |
| EP | 2832474 A1 | 2/2015 | |
| EP | 3075470 A1 | 10/2016 | |
| EP | 3103568 A1 | 12/2016 | |
| FR | 2980380 A1 | 3/2013 | |
| JP | H05-171423 A | 7/1993 | |
| JP | 2003241394 A | 8/2003 | |

(56) References Cited

FOREIGN PATENT DOCUMENTS

| | | |
|---|---|---|
| JP | 2003245981 | 9/2003 |
| JP | 2009006509 A | 1/2009 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | 2006048076 A1 | 5/2006 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | 2009023682 A1 | 2/2009 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | 2012148471 A1 | 11/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

Weigel, TH., et al., "Design And Preparation Of Polymeric Scaffolds For Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Gibson, D.W., et al., "Additive Manufacturing Technologies: Rapid Prototyping to Direct Digital Manufacturing", 2010, pp. 126-129, Springer, New York.

Motojima, Seiji, et al., "Chemical Vapor Growth Of LaB6 Whiskers And Crystals Having A Sharp Tip", Journal Of Crystal Growth, vol. 44, No. 1, Aug. 1, 1978 (Aug. 1, 1978), pp. 106-109.

International Search Report and Written Opinion pertaining to Application No. PCT/EP2017/062120 filed May 19, 2017 (13 pages).

International Search Report and Written Opinion pertaining to Application No. PCT/EP2017/062151 filed May 19, 2017 (13 pages).

\* cited by examiner

METHOD FOR ADDITIVE MANUFACTURING

CROSS-REFERENCE TO RELATED APPLICATIONS

This application claims priority to and the benefit of U.S. Provisional Patent Application Ser. No. 62/340,874, filed May 24, 2016, the contents of which as are hereby incorporated by reference in their entirety.

BACKGROUND

The present invention relates to a method for additive manufacturing with improved material properties and/or with improved process stability.

Freeform fabrication or additive manufacturing is a method for forming three-dimensional articles through successive fusion of chosen parts of powder layers applied to a worktable.

Such an apparatus may comprise a work table on which the three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

When an energy beam in the form of an electron beam hits the powder, a charge distribution develops around the electron target area. Desirably, this charge will be led through a produced part of the article to be made and/or the powder bed towards ground. If the charge distribution density exceeds a critical limit, an electrical field having field strength above a predetermined level will develop around the position where the beam is radiating. The electrical field having electrical field strength above the predetermined level will be referred to as $E_{max}$. An electrical field will cause the powder particles to repel each other such that particles leave the uppermost surface layer of the powder bed and create a distribution of particles floating above the surface. The floating particles resemble a cloud positioned above the surface. When the electrical field has field strength above $E_{max}$, the electrical field, i.e. the particle cloud or smoke of powder, will influence the resolution of the device in a negative way. This is partly due to the fact that the particles in the particle cloud will diverge the electron beam. When the electrical field has field strength below $E_{max}$, the electrical field, i.e. the particle cloud, will not influence the resolution of the device in a significant way. A field strength below $E_{max}$ is thus desirable.

Since the particles are charged they will seek a ground contact and thereby some may leave the cloud and will then contaminate different parts of the device being positioned inside the vacuum chamber. A result of such a critical electrical field is that the structure of the powder surface will be destroyed.

DESCRIPTION OF RELATED ART

One solution to the problem of avoiding charging of powder is disclosed in WO 2008/147306. In the document the amount of ions present in close vicinity to the position where the electron beam radiates the powder material is controlled. This is according to one example embodiment performed by introducing a supplementary gas into the vacuum chamber, which is capable of producing ions when irradiated by the electron beam.

The problem with the solution is that the supplementary gas increases the electron beam spot dimension and thereby affects the resolution of the additive manufacturing process in a negative way. Another problem is that the arrangement for providing supplementary gas into the build chamber may be expensive and complex.

Another problem is that finished additive manufactured parts may have an undesired microstructure, which in turn will affect the material properties of the final part.

BRIEF SUMMARY

An object of the invention is to provide a method for additive manufacturing with improved material properties and/or a method for manufacturing with improved process stability. This object is achieved by the features in the method according to the claims recited herein.

In a first aspect of the invention it is provided a method for forming a three-dimensional article through successive fusion of parts of a metal powder bed, which parts corresponds to successive cross sections of the three-dimensional article, the method comprising the steps of: providing a vacuum chamber, providing at least one electron beam source, providing a titanium alloy or pure titanium powder layer on a work table inside the vacuum chamber, where at least one gas comprising hydrogen is absorbed into or chemically bonded to the titanium or titanium alloy powder to a concentration of 0.01-0.5% by weight of the hydrogen, directing the at least one electron beam from the at least one electron beam source over the work table causing the powder layer to fuse in selected locations to form a first cross section of the three-dimensional article, providing a second powder layer on the work table of a titanium alloy or pure titanium inside the build chamber, where at least one gas comprising hydrogen is absorbed into or chemically bonded to the titanium or titanium alloy powder to a concentration of 0.01-0.5% by weight of the hydrogen, directing the at least one electron beam over the work table causing the second powder layer to fuse in selected locations to form a second cross section of the three-dimensional article, wherein the second layer is bonded to the first layer, and releasing a predefined concentration of the gas from the metal powder into the vacuum chamber when heating and/or fusing the metal powder layer, wherein at least a portion of the gas is capable of forming ions when being irradiated by the electron beam for balancing an amount of charged powder particles produced by the electron beam.

An exemplary advantage of various embodiments of the present invention is that the vacuum environment is incorporated into the powder material. Another exemplary advantage of various embodiments of the present invention is that the gas is released when it is needed and where it is needed.

In one example embodiment of the present invention the gas is pure hydrogen, deuterium or a mixture thereof or a mixture of an inert gas and hydrogen and/or deuterium. An exemplary advantage of at least this embodiment is that hydrogen is an inexpensive gas. Another advantage of this embodiment is that hydrogen is very easily ionized. Yet another advantage of this embodiment is that hydrogen does not affect the electron beam spot quality as much as other gaseous compounds.

In still another example embodiment of the present invention further comprising the steps of: providing a first supplementary gas into the vacuum chamber, which first supplementary gas is capable of reacting chemically with or being absorbed by a finished three-dimensional article, and releasing a predefined concentration of the gas which had reacted chemically with or being absorbed by the finished three dimensional article. An exemplary advantage of at least this embodiment is that the microstructure of the final three-dimensional article may be changed by introducing a gas into the final product which is later on released from the product.

In still another example embodiment of the present invention the first supplementary gas is introduced into the build chamber also for cooling the finished three-dimensional article. An exemplary advantage of at least this embodiment is that not only the finished three-dimensional article is cooled by a supplementary gas but also reacting with or bonding to the supplementary gas.

In another aspect of the present invention it is provided a method for forming a three-dimensional article through successive fusion of parts of a metal powder bed, which parts corresponds to successive cross sections of the three-dimensional article, the method comprising the steps of: providing a build chamber, providing at least one high energy beam source, providing a first metal powder layer on a work table inside the vacuum chamber, directing at least one high energy beam from the at least one high energy beam source over the work table causing the first metal powder layer to fuse in selected locations to form a first cross section of the three-dimensional article, providing a second metal powder layer on the work table, directing at least one high energy beam over the work table causing the second metal powder layer to fuse in selected locations to form a second cross section of the three-dimensional article, wherein the second layer is bonded to the first layer, providing a first supplementary gas into the build chamber, which first supplementary gas comprising hydrogen, is capable of reacting chemically with or being absorbed by a finished three-dimensional article, and releasing a predefined concentration of the gas which had reacted chemically with or being absorbed by the finished three dimensional article.

An exemplary advantage of at least this embodiment is that a thermoshydrogen process (THP) may take part wholly or partly within the additive manufacturing equipment. Another exemplary advantage of at least this embodiment is that a part of the THP process is integrated in the cooling process of the additively manufactured 3-dimensional part inside the additive manufacturing equipment.

In an example embodiment of the present invention the predefined concentration of the gas which is released from the finished three-dimensional article is at least 95% of the amount being absorbed or chemically reacted with the finished three-dimensional article. In another example embodiment the predefined concentration of the gas which is released from the finished three-dimensional article is at least 99% of the amount being absorbed or chemically reacted with the finished three-dimensional article.

Further exemplary advantages of these embodiments are that the final concentration in the three dimensional article may be tailored for the specific application. The release of the gas from the three-dimensional article may be measured for determining the remaining content of the gas in the three-dimensional article. In another example embodiment the outgassing is performed under given conditions where for instance the time is a measure of the remaining gas concentration in the three-dimensional article.

In another example embodiment the first supplementary gas comprising one or more selected from the group of: deuterium, hydrocarbons, gaseous organic compounds, ammonia, nitrogen, oxygen, carbon monoxide, carbon dioxide, nitrogen, nitrous oxide, helium, Argon, Neon, Krypton, Xenon and/or Radon. An exemplary advantage of at least this embodiment is that hydrogen may be mixed with other gases which in turn may affect the final properties of the three-dimensional article.

In another example embodiment the metal powder is Ti, Ti-6Al-4V or any other Ti-alloy and wherein the first supplementary gas, absorbed by or chemically reacted with the finished three-dimensional article, is capable of hydrogenizing the Ti, Ti-6Al-4V or the Ti alloy. An exemplary advantage of at least this embodiment is that additively manufactured parts comprising Titanium may be hydrogenized fully or at least partly within the ordinary additive manufacturing process.

In another example embodiment of the present invention the releasing of a predefined concentration of the gas which had reacted chemically with or being absorbed by the three dimensional article is performed by holding the finished three-dimensional article at a predetermined temperature interval for a predefined time interval in the build chamber when a second supplementary gas is introduced into the build chamber or without any supplementary gas introduced into the build chamber. An exemplary advantage of at least this embodiment is that the THP process is fully integrated in the additive manufacturing process. In embodiments, the second supplementary gas is free from H2.

In another example embodiment the high energy beam is a laser beam and/or an electron beam. An exemplary advantage of at least this embodiment is that the THP process can be integrated in an additive manufacturing process independently of the high energy beam used for heating and/or melting the powder material.

As a specific example, there may be provided a method for forming a three-dimensional article through successive fusion of parts of a metal powder bed, which parts corresponds to successive cross sections of the three-dimensional article, the method comprising the steps of: distributing a first metal powder layer on a work table inside a build chamber, directing at least one high energy beam from at least one high energy beam source over the work table causing the first metal powder layer to fuse in selected locations to form a first cross section of the three-dimensional article, distributing a second metal powder layer on the work table, directing at least one high energy beam over the work table causing the second metal powder layer to fuse in selected locations to form a second cross section of the three-dimensional article, wherein the second layer is bonded to the first layer, introducing a first supplementary gas into the build chamber, which first supplementary gas comprising hydrogen, is capable of reacting chemically with or being absorbed by a finished three-dimensional article, and releasing a predefined concentration of the gas which had reacted chemically with or being absorbed by the finished three dimensional article.

Also provided according to various embodiments is an apparatus for forming a three-dimensional article through successive fusion of parts of a metal powder bed, which parts corresponds to successive cross sections of the three-dimensional article, the apparatus comprising: a build chamber; a working table onto which layers of powdery material are to be placed; at least one high energy beam source; and at least one control unit, wherein the apparatus is configured, via the at least one control unit, for: distributing a first metal powder layer on a work table inside the build chamber, directing at least one high energy beam from the at least one high energy beam source over the work table causing the first metal powder layer to fuse in selected locations to form a first cross section of the three-dimensional article, distributing a second metal powder layer on the work table, directing at least one high energy beam over the work table causing the second metal powder layer to fuse in selected locations to form a second cross section of the three-dimensional article, wherein the second layer is bonded to the first layer, providing a first supplementary gas into the build chamber, which first supplementary gas comprising hydrogen, is capable of reacting chemically with or being absorbed by a finished three-dimensional article, and releasing a predefined concentration of the gas which had reacted chemically with or being absorbed by the finished three dimensional article.

Lastly provided according to various embodiments is a computer program product comprising at least one non-transitory computer-readable storage medium having computer-readable program code portions embodied therein, the computer-readable program code portions comprising at least one executable portion configured for: distributing a first metal powder layer on a work table inside a build chamber, directing at least one high energy beam from at least one high energy beam source over the work table causing the first metal powder layer to fuse in selected locations to form a first cross section of the three-dimensional article, distributing a second metal powder layer on the work table, directing at least one high energy beam over the work table causing the second metal powder layer to fuse in selected locations to form a second cross section of the three-dimensional article, wherein the second layer is bonded to the first layer, providing a first supplementary gas into the build chamber, which first supplementary gas comprising hydrogen, is capable of reacting chemically with or being absorbed by a finished three-dimensional article, and releasing a predefined concentration of the gas which had reacted chemically with or being absorbed by the finished three dimensional article.

BRIEF DESCRIPTION OF SEVERAL VIEWS OF THE DRAWINGS

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
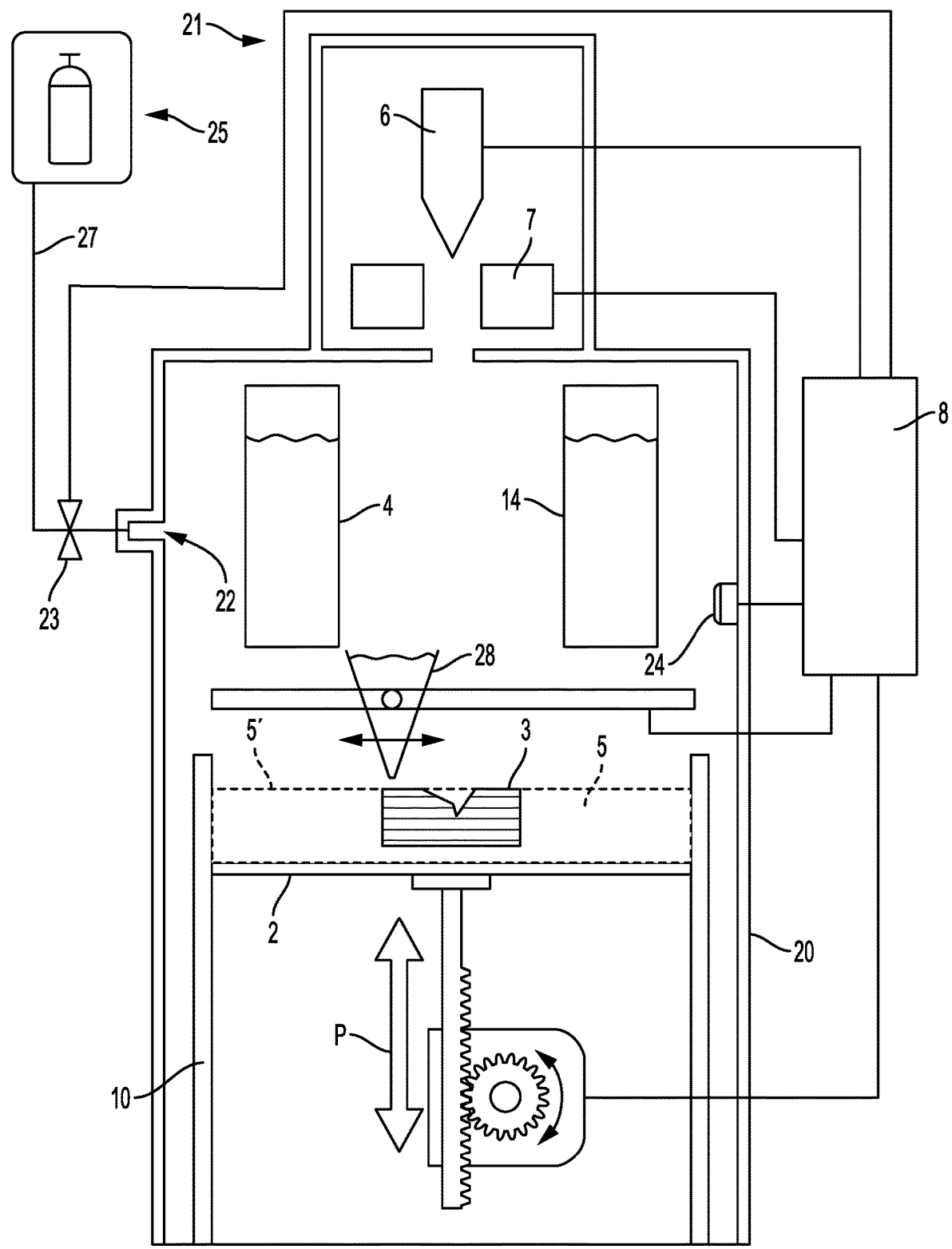
FIG. 2 shows, in a schematic view, an example embodiment of a device for producing a three dimensional product in which device a first example embodiment of the inventive method can be applied.

FIG. 2 depicts an embodiment of a freeform fabrication or additive manufacturing apparatus 21 in which the inventive methods according to the present invention may be implemented.

The apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam gun 6 generates a focusable electron beam with an accelerating voltage of about 15-60 kV and with a beam power in the range of 3-10 Kw. The pressure in the vacuum chamber may be 1×10−3 mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An electron beam may be directed over the build platform 2 causing the first powder layer to fuse in selected locations to form a first cross section of the three-dimensional article. The beam is directed over the build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on the build platform 2. The second powder layer is preferably distributed according to the same manner as the previous layer. However, there might be alternative methods in the same additive manufacturing machine for distributing powder onto the work table. For instance, a first layer may be provided by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost powder layer but also remelting at least a fraction of a thickness of a layer directly below the uppermost powder layer.

When an electron beam is used, it is necessary to consider the charge distribution that is created in the powder as the electrons hit the powder bed 5. The charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with predetermined values of the beam current and beam scanning velocity.

A general function for describing the charge density that develops in the powder in an arbitrary scanning procedure will be a rather complex function of time and beam position since the charge density generated along one scanned path will be affected by the charge density generated along another scanned path if these paths are not very well separated in space and time. Thus, charge summation effects between different paths must be taken into account.

Figure 4:
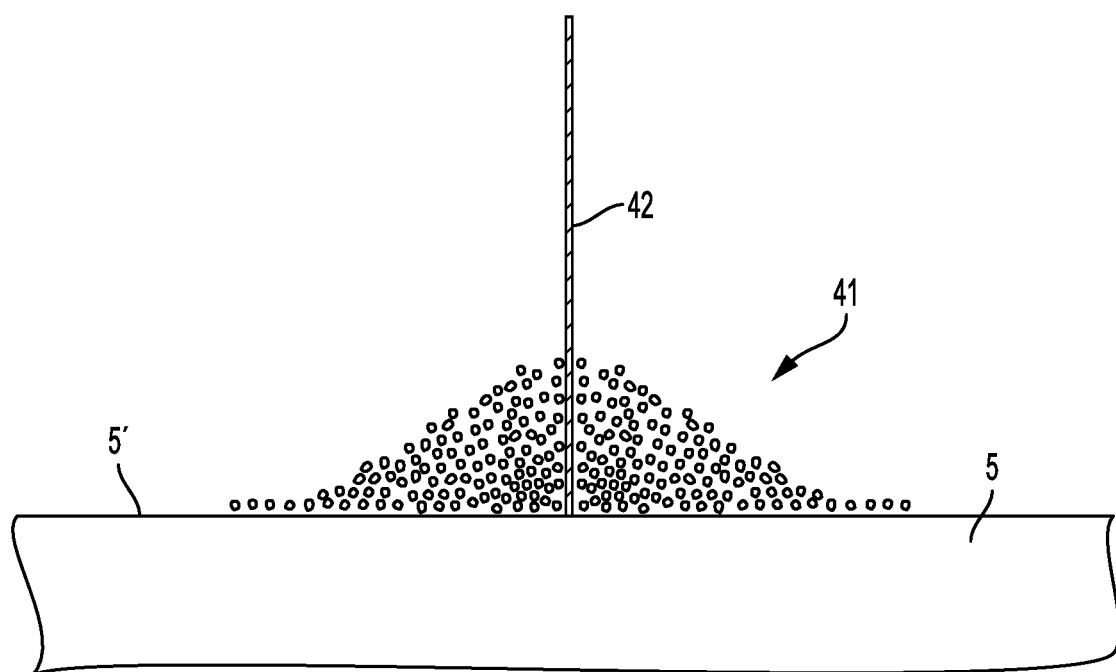
FIG. 4 depicts, in schematic view, an example of the surface of the powdery material with a charged particle cloud.

FIG. 4 shows the upper layer 5' of the powder bed 5 of the powdery material with a charged particle cloud 41. The cloud is concentrated around the position where the electron beam 42 radiates the powdery material. With a higher electrical field, a larger cloud will occur around the radiating point.

Ions created in the vacuum chamber should thus be above a predefined level in order to neutralize enough charges in the surface of the powder. The predefined level should be selected such that it keeps the electrical field strength below $E_{max}$. In doing so, enough of the powdery material is neutralized and lifting of powder is prohibited.

Figure 1:
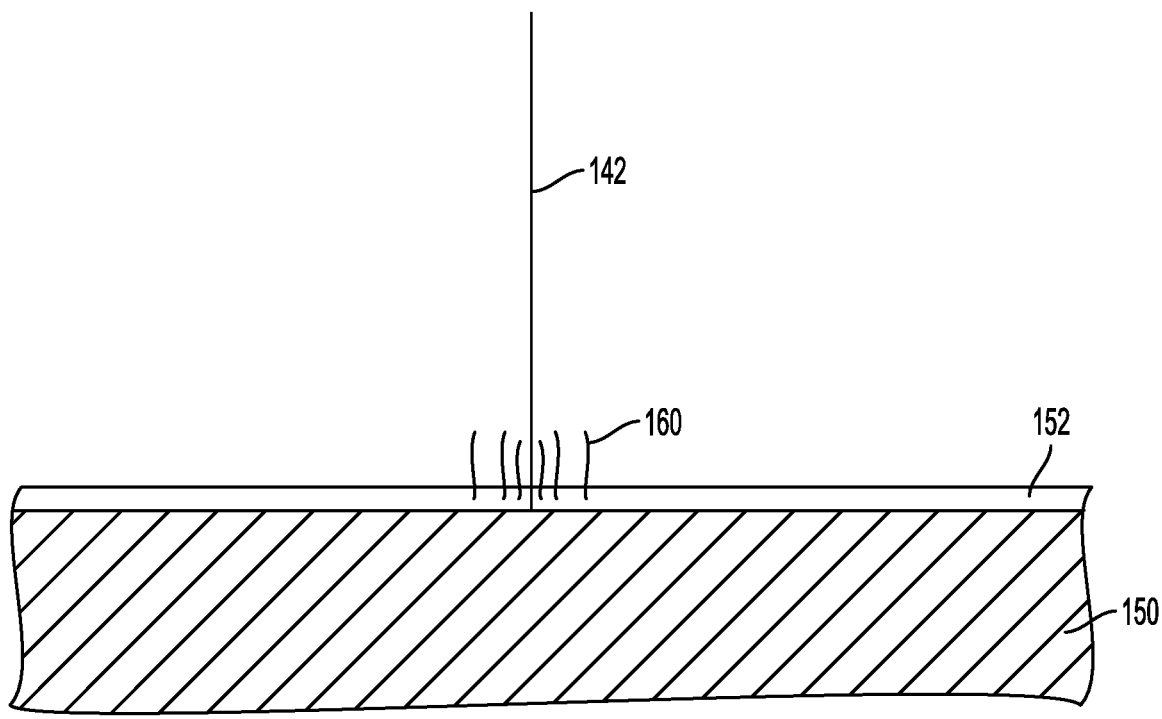
FIG. 1 depicts, in schematic view, an example of the surface of the powdery material which is outgassing when irradiated by the electron beam, outgassing may start due to high temperature only.

FIG. 1 depicts, in schematic view, an example of the surface of the powder layer (152), on top of a partly finished three-dimensional article (150), which is outgassing (160) when irradiated by the electron beam (142). Outgassing may also take place if the temperature is high enough for some other reason, for instance previous already melted powder layer or external heating other than the melting source for the powder material.

The gas is incorporated into the metal powder before it is used. The gas may be chemically bound to the metal powder particles at room temperature. When the powder is heated in the vacuum chamber, the gas is released into the vacuum. The gas will help to prevent smoke since the electron beam may transform the outgassing gas into ions.

Titanium can react with hydrogen gas to form titanium dihydride, TiH2. Titanium dihydride is stable at room temperature, but when it is heated above 300° C., hydrogen gas will start to be released from the titanium.

Ti-6Al-4V powder can be loaded with a predefined hydrogen concentration by heating the powder to a certain temperature in a hydrogen atmosphere. This hydrogen may then be released in the vacuum chamber when the powder is heated by the electron beam, by the partly finished 3-dimensional article and/or by any other heating source such as infrared heating, inductive heating or resistive heating.

The predefined hydrogen concentration in for instance pure Titanium powder or titanium alloy powder may be in the range of 0.01%-0.5% by weight. In another example embodiment the hydrogen concentration in pure titanium powder or titanium alloy powder may be in the range of 0.015-0.35% by weight.

The quantity of gas absorbed by or chemically bonded to the metal powder particles may in itself cause a pressure in the vacuum chamber between $1\times10^{-4}$-$1\times10^{-1}$ mbar, which means if additional components are present in the vacuum chamber not emanating from the powder material the additional components may add up to the total pressure in the vacuum chamber. Hydrogen can also be loaded during the powder manufacturing process.

Virgin metal powder (unused metal powder) can be loaded with a specific gas in a separate process before being installed in the additive manufacturing machine. Used powder may be reloaded with the gaseous compound and/or blended with virgin metal powder which is loaded with the gaseous compound. Virgin and/or used powder may be loaded with the gas within the build chamber as a process step before the additive manufacturing process is starting. The vacuum chamber may be filled with the required gas and the powder may be heated to a sufficient temperature in its powder container for allowing the powder to react with or bond to the powder metal particles. During the loading step of the gas into the metal powder in the vacuum chamber, the vacuum pumps may be shut off and the vacuum chamber may be closed to its surrounding media. Vacuum is created as soon as the metal powder is loaded with a sufficient amount of gas. A certain amount of gas is supposed to be loaded in the powder after a certain time period if using a known concentration and a known temperature of the metal powder.

Metal powder loaded with hydrogen is much more inexpensive than inserting helium into the build chamber from an external gas source such as a gas tank. Gas is provided where it is supposed to give effect, i.e., close to the top surface of the metal powder layer. After release of the gas from the metal powder the gas is capable of being transformed into ions by the electron beam. The ions will help to neutralize charged metal particles and thereby prohibit metal powder particles to lift from the powder layer. With the gas loaded into the metal powder there is no need for hardware to control the supply of external gas into the vacuum chamber. Hydrogen is more easily ionized than helium which will increase the likelihood of having ionized hydrogen atoms close to the powder layer surface where it may neutralize the charged metal powder particles. Hydrogen gas is more transparent to the electron beam than helium gas because of its lower atom number. This in turn will reduce its effect on the electron beam, i.e., hydrogen will cause a less divergent electron beam than any other available gas. Since the gas is released only when the temperature of the powder is above a predetermined value, the gas is released when needed. In case of gas supply from an external source the gas need to be supplied continuously and probably in a larger amount for achieving the same effect. Having the powder loaded with the gas one will always be sure that gas will be released for each layer built, whereas in case of external gas supply it may be occasions when an additive manufacturing process may run out of gas which in turn may result in a crash. There is no need for having pressure gauges or gas detectors since one can preload the metal powder with the correct amount of gas from the beginning.

Figure 3:
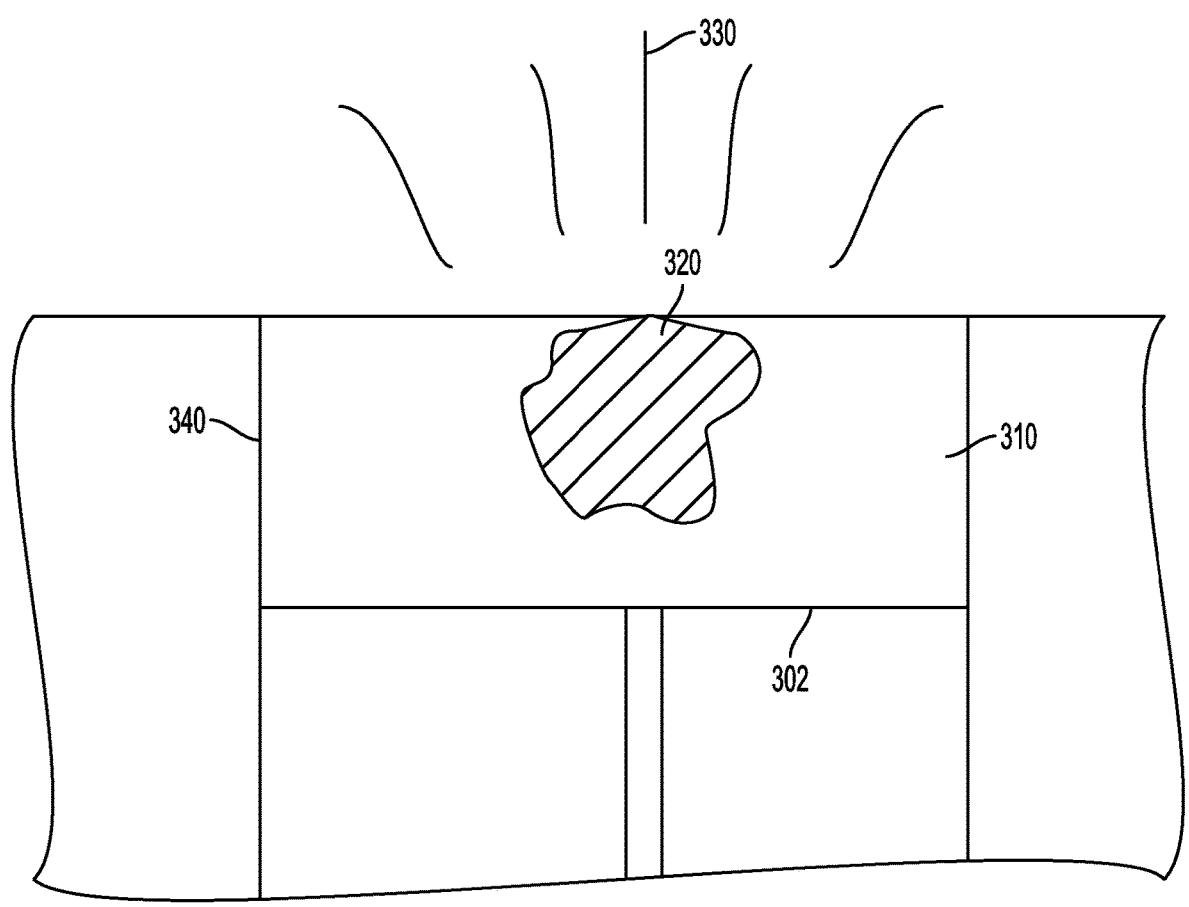
FIG. 3 depicts a finished 3-dimensional article which is reacting with a supplementary gas inside a vacuum chamber.

FIG. 3 depicts a second example embodiment according to the present invention. In FIG. 3 it is schematically shown, in a side view, a finished three-dimensional article 320 embedded in non-fused powder material 310 on top of a build table 302 in a build chamber 340. Correct microstructures in the final 3-dimensional article is of outmost importance in various applications. We have found that instead of cooling the final three-dimensional article 320 in helium gas which is currently made, one can cool the final three-dimensional article 320 in pure Hydrogen gas 330 or a gas 330 comprising a certain amount of hydrogen. It is then possible to refine the microstructures in the three-dimensional article 320 wholly or partly within the build chamber. Thermo Hydrogen Processing (THP) is a method for refining microstructures in an article. In THP the article is heated in a hydrogen atmosphere for a certain time and under a certain temperature for loading the article with hydrogen. The hydrogen is then released by heat treatment under vacuum conditions. The inventive idea is to substitute the helium gas in the additive manufacturing process for cooling the final 3-dimensional article with hydrogen gas or a gas comprising a certain amount of hydrogen, for instance a mixture of helium and hydrogen. The loading of hydrogen into the final 3-dimensional article then naturally takes place during its cooling step. The release of hydrogen can be made within the build chamber 340 by heating the 3-dimensional article 320 to a predefined temperature under vacuum conditions. Alternatively the release of hydrogen may take place in a separate process chamber, for instance during a HIP (Hot Isostatic pressure) post treatment step. By incorporating the THP step(s) in the additive manufacturing process one may save manufacturing time as well as redundant process equipment. Hydrogen may be supplied into the build chamber from an external source. Alternatively unused powder in the powder container inside the build chamber may be heated for releasing of hydrogen. Powder material may be preloaded with hydrogen so a heating of the powder container may start release of hydrogen which in turn may be loaded into the final three dimensional article if the final three dimensional article has correct temperature. During the loading of the gas into the final three-dimensional article the vacuum pumps may be switched off. During the release of the hydrogen from the final three-dimensional article, the vacuum pumps may be switched on.

In an example embodiment of the present invention the THP process is taking place within the additive manufacturing equipment and integrated with the cooling of the finished three dimensional article.

External gas supply may be provided via a gas bottle 25 which is connectable to the additive manufacturing apparatus 21 via a pipe 27 and a valve 23, see FIG. 2. The valve is in this embodiment controlled by the control unit 8. When the valve is open gas from the gas source 25 will be provided into the additive manufacturing device 21 through an inlet 22. The valve may be set to any position between fully open and fully closed, i.e., the gas flow may be regulated by the valve 23. In an alternative embodiment a pressure and flow regulator may be provided directly on the gas source 25, leaving the only functionality of the valve 23 to be the opening and closing means for the gas into the additive manufacturing apparatus 21. The gas in the gas source may be used for loading the powder material with a predefined amount of gas and/or the finished three-dimensional article with a predefined amount of gas.

During a preheating the powder provided on the build platform 2 the powder is about to be brought to an appropriate temperature before fusing the powder. This preheating step may be performed by scanning the electron beam over the powder bed in an appropriate manner for heating the powder bed without creating powder smoke. This may be performed by leaving enough spacing between two consecutive scanning lines so the summation of charges in a first scanning line is not affecting the charges provided in the second scanning line. During preheating gas, which is preloaded into the powder material, may be released inside the additive manufacturing apparatus 21 resulting in a pressure level which is high enough for suppressing or eliminating smoke of powder. The pressure level may be around $1 \times 10^{-3}$ mbar. The pressure level may be at a constant high level throughout the preheating. Alternatively the pressure level is varying during the preheating but always high enough in order to suppress smoke of powder. Smoke of powder is most likely to be present in the beginning of the preheating when no powder is sintered at all. The more the powder is sintered the less is the likelihood of creating smoke of powder. Since most gas is present in the powder material before starting to heat the powder, the gas concentration may be higher in the beginning of the preheating process than at the end of the same. The higher gas concentration in the beginning of the preheating process will reduce or eliminate the risk of powder smoke formation.

During a fusion step 33 the pressure in the additive manufacturing apparatus 21 may be kept as low as possible which may be about $1 \times 10^{-5}$ mbar or lower. This lower gas pressure is more or less self-regulating since most of or all of the preloaded gas into the powder material has been released during the preheating step. When the actual fusing of the powder material takes place the powder material has no longer any gas bonded to it or chemically reacted with it.

When the fusion step is finalized the powder and fused powder may need some heating in order to be within a predetermined temperature interval. The preheating temperature is material dependent which means that different materials require different preheating temperature intervals. The temperature chosen for the preheating may affect the internal stresses and fatigue properties of the final three dimensional article. When the heating is finalized or when no heating is needed, the process starts all over again by providing the next powder layer.

The pressure level during preheating may be kept at a relatively high pressure in order to ensure a safe suppression of smoke of powder which is very material dependent given the same power of the electron beam. The pressure level during fusion may be kept at a relatively low pressure in order to keep the electron beam quality as good as possible, i.e., as little as possible blurred by interaction of the atoms during the path from an electron beam filament to the powder layer.

A first supplementary gas provided into the vacuum chamber may be capable of reacting chemically with or being absorbed by the finished three-dimensional article. The first supplementary gas may be at least one or more in the group of: Hydrogen, deuterium, hydrocarbons, gaseous organic compounds, ammonia, nitrogen, oxygen, carbon monoxide, carbon dioxide, nitrogen, nitrous oxide, helium, Argon, Neon, Krypton, Xenon and/or Radon.

The pressure level during the chemically reaction with or absorbing by the finished three-dimensional article may be changed depending on the type of first supplementary gas chosen, a lighter atom may need a somewhat higher pressure than a heavier atom chosen among the supplementary gases given above.

A mean pressure level during the preheating may be higher than a mean pressure level during the fusion of the selected locations. The reason of having a higher pressure level of the at least first supplementary gas is to reduce or eliminate the likelihood of powder smoke. A certain number of ions are needed in the vacuum chamber in order to neutralize or decreasing the amount of the charges in the powder created by the ion beam when hitting the powder.

During the fusion one wants to keep the pressure level of the gases in the vacuum chamber at a minimum since the gas atoms may more or less influence the resolution of the electron beam. Depending on the type of ions present in the vacuum chamber there may be some differences in the pressure allowed for maintaining the same electron beam resolution for reasons as explained above.

In another aspect of the invention it is provided a program element configured and arranged when executed on a computer to implement a method as detailed elsewhere herein. The program element may be installed in a computer readable storage medium. The computer readable storage medium may be the control unit 8 or on another control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
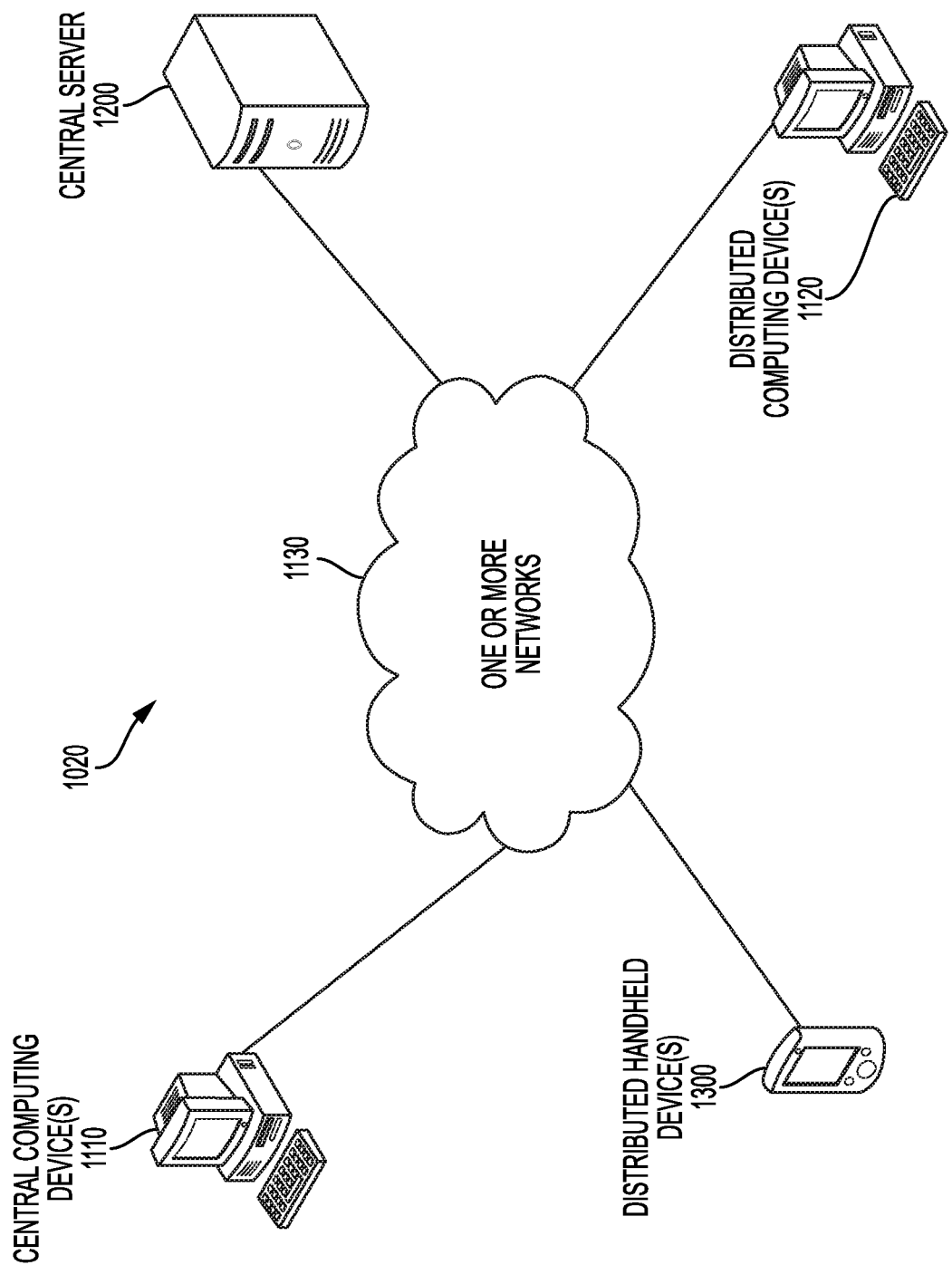
FIG. 5 is a block diagram of an exemplary system 1020 according to various embodiments.

FIG. 5 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6A:
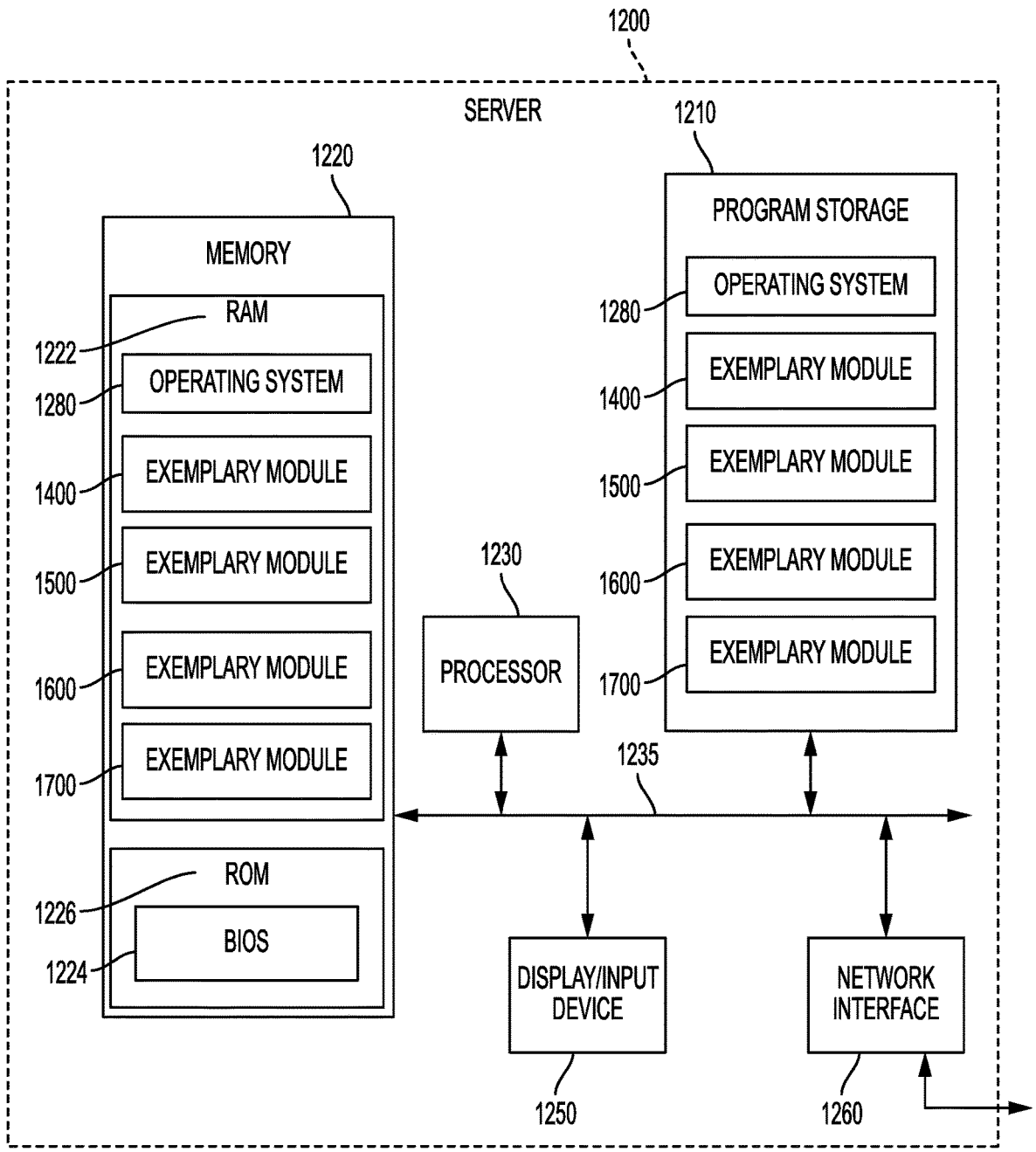
FIG. 6A is a schematic block diagram of a server 1200 according to various embodiments.

FIG. 6A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1060 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 6B:
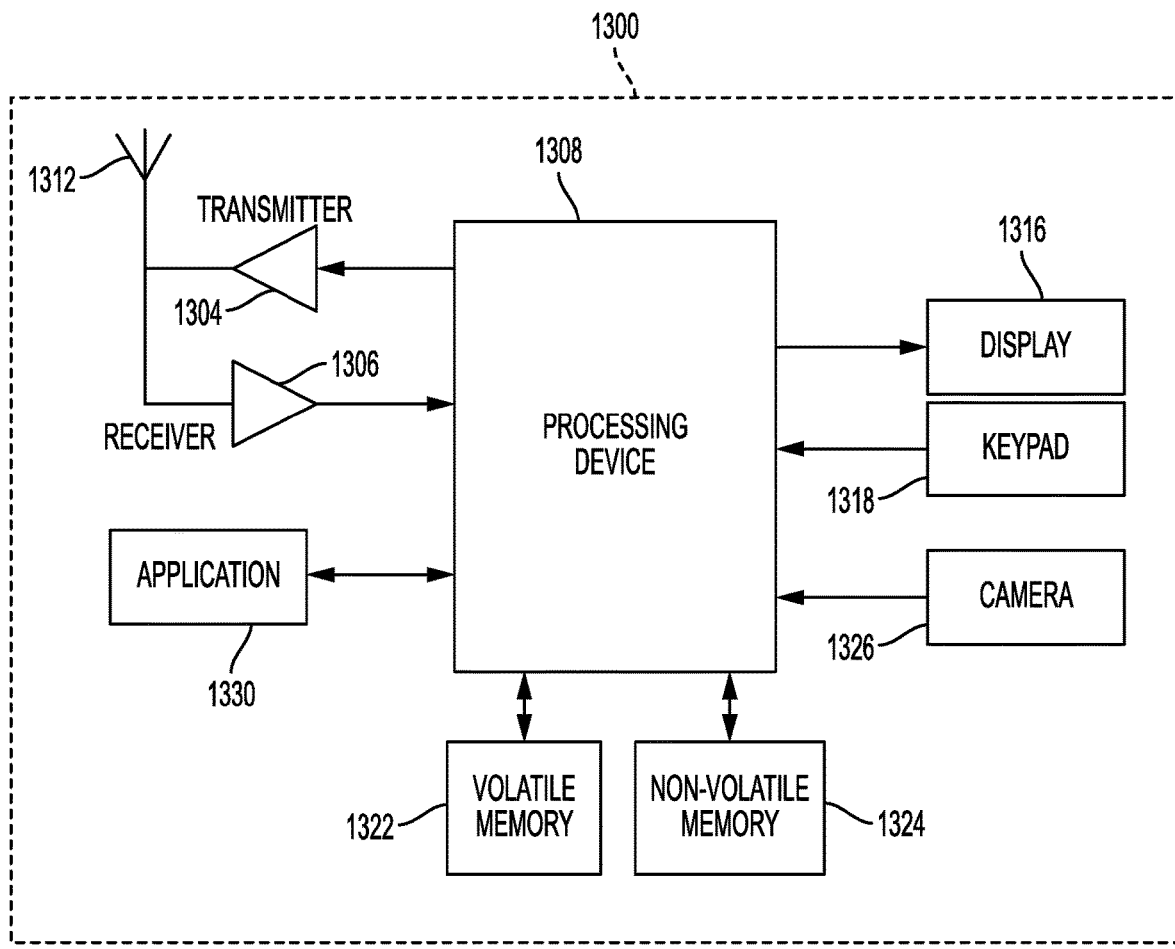
FIG. 6B is a schematic block diagram of an exemplary mobile device 1300 according to various embodiments.

FIG. 6B provides an illustrative schematic representative of a mobile device 1300 that can be used in conjunction with various embodiments of the present invention. Mobile devices 1300 can be operated by various parties. As shown in FIG. 6B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It will be appreciated that many variations of the above systems and methods are possible, and that deviation from the above embodiments are possible, but yet within the scope of the claims. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Such modifications may, for example, involve using a different source of energy beam than the exemplified electron beam such as laser beam. Other materials than metallic powder may be used such as powder of polymers or powder of ceramics. Still further, although specific terms are employed herein, they are used in a generic and descriptive sense only and not for purposes of limitation.

I claim:

1. An apparatus for forming a three-dimensional article through successive fusion of parts of a metal powder bed, which parts corresponds to successive cross sections of the three-dimensional article, the apparatus comprising:
    a build chamber;
    a working table onto which layers of metal powder are to be placed;
    at least one high energy beam source; and
    at least one control unit comprising a processor and computer program instructions that, when executed by the processor of the at least one control unit, cause the apparatus to:
        distribute a first metal powder layer on a work table inside the build chamber,
        direct at least one high energy beam from the at least one high energy beam source over the work table causing the first metal powder layer to fuse in selected locations to form a first cross section of the three-dimensional article, distribute a second metal powder layer on the work table, direct at least one high energy beam over the work table causing the second metal powder layer to fuse in selected locations to form a second cross section of the three-dimensional article, wherein the second layer is bonded to the first layer, release a predefined concentration of at least one gas from the first metal powder layer into the build chamber when fusing the first metal powder layer and the second metal powder layer, release a first supplementary gas into the build chamber, which first supplementary gas comprising hydrogen, is capable of reacting chemically with or being absorbed by the finished three-dimensional article, and heat the finished three-dimensional article to a predetermined temperature at which a predefined concentration of the first supplementary gas which had reacted chemically with or being absorbed by the finished three-dimensional article is released from the finished three-dimensional article, wherein the releasing of the predefined concentration of the first supplementary gas which had reacted chemically with or being absorbed by the three dimensional article is performed by holding the finished three-dimensional article at a predetermined temperature interval for a predefined time interval in the build chamber when a second supplementary gas is introduced into the build chamber, the second supplementary gas is free from $H_2$.

2. The apparatus according to claim 1, wherein the predefined concentration of the gas which is released from the finished three-dimensional article is at least 95% of the amount being absorbed or chemically reacted with the finished three-dimensional article.

3. The apparatus according to claim 1, wherein the first supplementary gas further comprises at least one inert gas.

4. The apparatus according to claim 1, wherein the first supplementary gas further comprises a gas selected from the group consisting of: deuterium, hydrocarbons, gaseous organic compounds, ammonia, nitrogen, oxygen, carbon monoxide, carbon dioxide, nitrogen, nitrous oxide, helium, Argon, Neon, Krypton, Xenon and Radon.

5. The apparatus according to claim 1, wherein the metal powder is Ti, Ti-6Al-4V or any other Ti alloy and wherein the first supplementary gas, absorbed by or chemically reacted with the finished three-dimensional article, is capable of hydrogenizing the Ti, Ti-6Al-4V or the Ti alloy.

6. The apparatus according to claim 1, wherein either:
the high energy beam is either an electron beam or a laser beam; or
the high energy beam is an electron beam and the build chamber is a vacuum chamber.

7. The apparatus according to claim 1, wherein:
the at least one gas comprises hydrogen and is absorbed into or chemically bonded to the titanium or titanium alloy powder to a concentration of 0.01-0.5% by weight of the hydrogen; and
at least a portion of the released gas is configured for forming ions when being irradiated by the at least one electron beam such that ions are formed for balancing an amount of charged powder particles produced by the at least one electron beam to keep the electrical field strength below $E_{max}$.

8. A method for forming a three-dimensional article through successive fusion of parts of a metal powder bed, which parts corresponds to successive cross sections of the three-dimensional article, the method comprising the steps of:

distributing a first metal powder layer on a work table inside a build chamber, directing at least one high energy beam from at least one high energy beam source over the work table causing the first metal powder layer to fuse in selected locations to form a first cross section of the three-dimensional article, distributing a second metal powder layer on the work table, directing at least one high energy beam over the work table causing the second metal powder layer to fuse in selected locations to form a second cross section of the three-dimensional article, wherein the second layer is bonded to the first layer, releasing a predefined concentration of at least one gas from the first metal powder layer into the build chamber when fusing the first metal powder layer and the second metal powder layer, releasing a first supplementary gas into the build chamber, which first supplementary gas comprising hydrogen, is capable of reacting chemically with or being absorbed by the finished three-dimensional article, and heating the finished three-dimensional article to a predetermined temperature at which a predefined concentration of the first supplementary gas which had reacted chemically with or being absorbed by the finished three-dimensional article is released from the finished three-dimensional article, wherein the releasing of the predefined concentration of the first supplementary gas which had reacted chemically with or being absorbed by the three dimensional article is performed by holding the finished three-dimensional article at a predetermined temperature interval for a predefined time interval in the build chamber when a second supplementary gas is introduced into the build chamber, the second supplementary gas is free from $H_2$.

9. The method according to claim 8, wherein the predefined concentration of the gas which is released from the finished three-dimensional article is at least 95% of the amount being absorbed or chemically reacted with the finished three-dimensional article.

10. The method according to claim 8, wherein the predefined concentration of the gas which is released from the finished three-dimensional article is at least 99% of the amount being absorbed or chemically reacted with the finished three-dimensional article.

11. The method according to claim 8, wherein the first supplementary gas comprises at least one inert gas.

12. The method according to claim 8, wherein the first supplementary gas comprises a gas selected from the group consisting of: deuterium, hydrocarbons, gaseous organic compounds, ammonia, nitrogen, oxygen, carbon monoxide, carbon dioxide, nitrogen, nitrous oxide, helium, Argon, Neon, Krypton, Xenon and/or Radon.

13. The method according to claim 8, wherein the metal powder is Ti, Ti-6Al-4V or any other Ti alloy and wherein the first supplementary gas, absorbed by or chemically reacted with the finished three-dimensional article, is capable of hydrogenizing the Ti, Ti-6Al-4V or the Ti alloy.

14. The method according to claim 8, wherein the releasing of a predefined concentration of the gas which had reacted chemically with or being absorbed by the three dimensional article is performed by holding the finished three-dimensional article at a predetermined temperature interval for a predefined time interval in the build chamber when a second supplementary gas is introduced into the build chamber or without any supplementary gas introduced into the build chamber.

15. The method according to claim 14, wherein the second supplementary gas is free from $H_2$.

16. The method according to claim 8, wherein the releasing of a predefined concentration of the gas which had reacted chemically with or being absorbed by the three dimensional article is performed in a post process outside the build chamber.

17. The method according to claim 16, wherein the post process is Hot Isostatic Pressing (HIP).

18. The method according to claim 8, wherein the high energy beam is either an electron beam or a laser beam.

19. The method according to claim 8, wherein the high energy beam is an electron beam and wherein the build chamber is a vacuum chamber.

20. The method according to claim 8, wherein one or more of the steps recited therein are computer-implemented.

* * * * *